United States Patent [19]

Dietz et al.

[11] Patent Number: 4,660,080
[45] Date of Patent: Apr. 21, 1987

[54] SYNCHRONIZATION CIRCUIT RESPONSIVE TO TIME-MULTIPLEXED SIGNALS

[75] Inventors: Wolfgang F. W. Dietz, New Hope, Pa.; Sammy S. Henig, Secaucus, N.J.

[73] Assignee: RCA Corporation, Princeton, N.J.

[21] Appl. No.: 813,392

[22] Filed: Dec. 24, 1985

[51] Int. Cl.$^4$ .......................... H04N 5/04; H03L 7/00
[52] U.S. Cl. ..................................... 358/158; 358/148; 331/18; 331/20
[58] Field of Search ............... 358/148, 149, 150, 153, 358/158, 159; 375/111, 119, 120; 370/100; 331/10, 11, 12, 13, 18, 20, 25

[56] References Cited

U.S. PATENT DOCUMENTS

| | | | |
|---|---|---|---|
| 3,074,027 | 1/1963 | Rout | 331/2 |
| 3,990,107 | 11/1976 | Hanma et al. | 360/37 |
| 4,093,963 | 6/1978 | Uchida | 358/158 |
| 4,144,544 | 3/1979 | Fernsler | 358/158 |
| 4,245,251 | 1/1981 | Steckler et al. | 358/158 |
| 4,251,833 | 2/1981 | Fernsler et al. | 358/148 |
| 4,363,003 | 12/1982 | Osaka et al. | 331/1 A |

FOREIGN PATENT DOCUMENTS 0140034  8/1982  Japan ................................. 358/158

Primary Examiner—James J. Groody
Assistant Examiner—Michael D. Parker
Attorney, Agent, or Firm—Eugene M. Whitacre; Paul J. Rasmussen; Joseph J. Laks

[57] ABSTRACT

A phase-lock loop circuit of a television apparatus is synchronized by a horizontal synchronizing input signal. The phase-lock loop circuit includes a frequency-to-voltage converter that is responsive, during vertical trace, to the synchronizing input signal for generating a control voltage indicative of the frequency of the synchronizing input signal. During vertical trace, the control voltage varies the free running frequency of a controlled oscillator of the phase-lock loop circuit such that the free running frequency of the oscillator is directly related to the frequency of the input signal. During vertical retrace, the frequency-to-voltage converter is responsive to the oscillator output signal for generating the control signal that maintains the free running frequency of the oscillator substantially unchanged during vertical retrace. The phase of the output signal of the oscillator is controlled by a signal that is indicative of the phase difference between the oscillator output signal and the synchronizing input signal.

17 Claims, 1 Drawing Figure

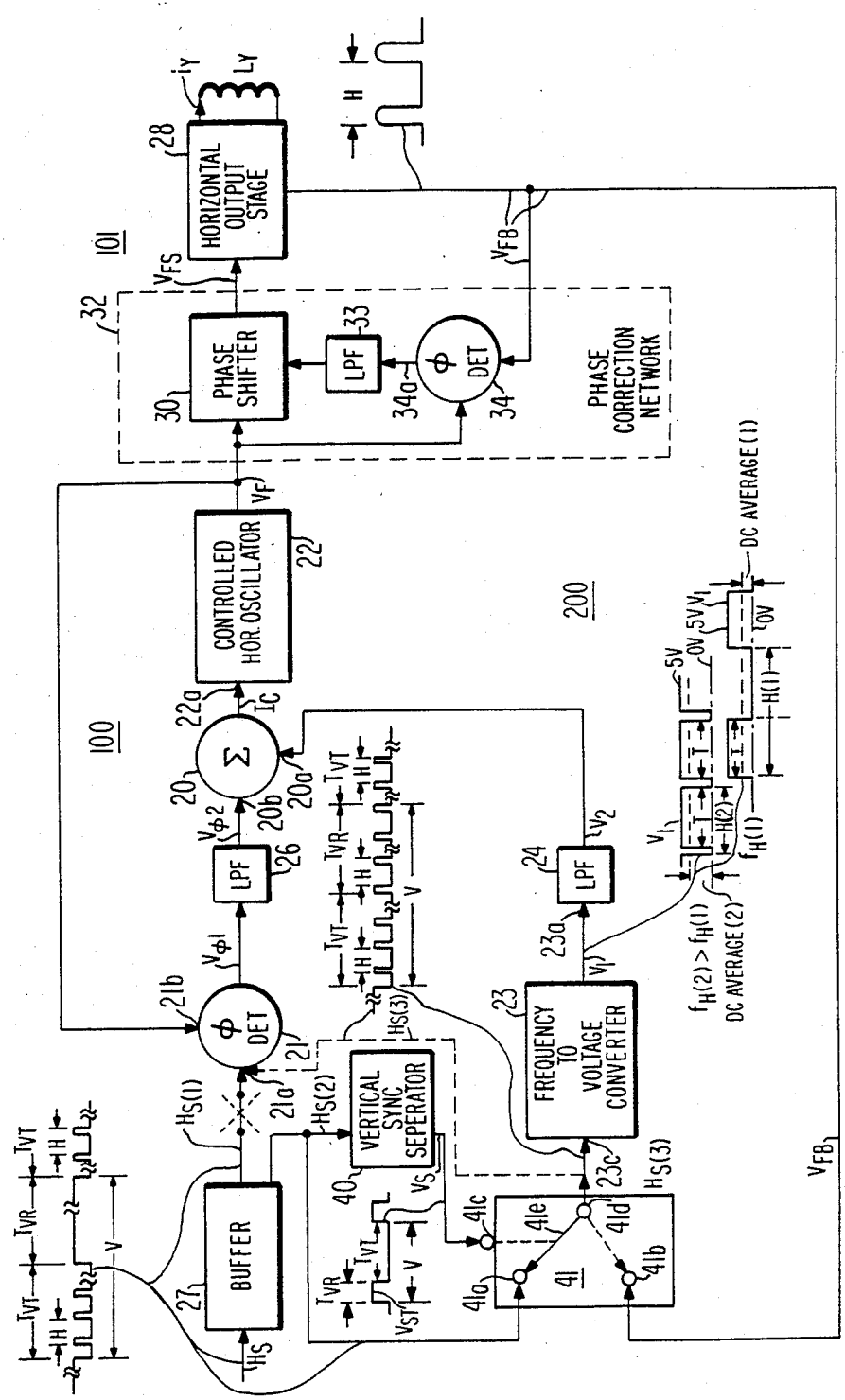

SYNCHRONIZATION CIRCUIT RESPONSIVE TO TIME-MULTIPLEXED SIGNALS

The invention is related to a video synchronization apparatus that synchronizes a source of an output signal to a synchronizing input signal.

In, for example, a television or display monitor, a deflection current produced by a deflection circuit output stage is synchronized to the horizontal sync pulses that are derived, using a conventional sync separator, from the incoming television signal. Direct synchronization of the deflection oscillator from the sync pulses may not be desirable due to excessive tendency of the deflection current generated by the output stage to be affected by disturbances, caused by, for example, noise that is present in the sync pulses. Instead, a phase-lock loop (PLL) is typically used for eliminating such disturbances. A PLL of this kind may comprise a tunable oscillator and a phase discriminator with a downstream lowpass filter. The phase discriminator provides comparison of a certain preassigned reference edge of the oscillator output signal with the sync pulse leading edge or center. A control voltage arising from the phase deviation is integrated in the lowpass filter and supplied to the oscillator as a DC voltage that varies the oscillator frequency and phase until the phase of the oscillator output signal and that of the corresponding sync pulse are the same. The remaining residual error depends on the control steepness or the loop gain.

It may be desirable that the response time of the PLL to phase, or frequency, variation of the sync pulses should not be too fast, in order to avoid scan line jitter due to disturbance caused by noise in the sync pulses. This is, typically, achieved by means of a relatively large time constant of the lowpass filter and a small total gain. However, such large filter reduces, by itself, the capture, or lock-in, range of the oscillator of the PLL. Such capture range is defined, for example, as the maximum difference between the oscillator free running frequency and the frequency of the synchronizing input signal that enables lock-in of the oscillator to the sync pulses. Morever, to avoid unnecessary lengthening of the capture or lock-in time, it may be desirable to specify that the capture range be limited to substantially not more than the maximum necessary in view of the maximum difference between the frequency of the sync pulses and the free running frequency of the oscillator that is encountered in operation. Limitation of the capture range to the maximum necessary may be achieved, for example, by limitation of the maximum range of variation of the control voltage that controls the oscillator frequency.

Frequency variations of the sync pulses, that occur in the course of, for example, receiving an incoming television signal in a conventional television receiver, generally are small relative to the frequency of the sync pulses. Therefore, in such application, imposing a limitation on the maximum control range of the control current that controls the oscillator frequency may not pose a problem. However, in some other applications, such as in television monitors that are designed for receiving incoming signals having diverse sync frequencies, a given frequency of the sync pulses may be one that is selected from a wide span of frequencies. For example, the frequency of the sync pulses may be a frequency selected from a span of frequencies between 15,750 to 31,500 Hz. Therefore, a desirable narrow capture range that covers from a frequency that is below, to a frequency that is above, a fixed free running frequency of the oscillator, is not sufficiently wide to permit synchronizing the oscillator over the entire possible span of frequencies of the sync pulses.

In a synchronization circuit that may be synchronized with a wide range of sync frequencies, a flywheel oscillator (OSC) is included. A synchronizing input signal is applied to a phase comparator, or detector. The output signal from the oscillator is fed back to the phase detector for comparison with the synchronizing input signal. A first control signal generated by the phase detector is applied to a control terminal of the oscillator for controlling the phase and frequency of the oscillator in accordance with the synchronizing input signal. The synchronizing input signal is also applied to a frequency discriminator operating as a frequency-to-voltage converter. The frequency-to-voltage converter generates a second control signal that is applied to the flywheel oscillator to vary the free-running frequency of the oscillator in such a manner that the ratio between this free-running frequency and the frequency of the synchronizing input signal is maintained approximately constant for different horizontal sync frequencies.

The synchronizing input signal may be obtained from, for example, a horizontal sync separator of a television monitor that provides horizontal sync pulses. However, in some television monitor applications, the television signal from which such horizontal sync pulses are derived does not include horizontal synchronization information during vertical retrace. During vertical blanking, or retrace, such television signal may comprise, for example, a wide pulse having a duration that may be slightly shorter than the vertical retrace interval. When horizontal sync pulses do not appear during vertical retrace at the input terminal of, for example, the frequency-to-voltage converter, the output voltage of the converter may deviate, during vertical retrace, from its steady state level. Such deviation may cause a transient disturbance in the frequency of the OSC that may be noticeable as a distortion at, for example, the top of the raster.

Such disturbance may be reduced by utilizing a filter having a time constant that is sufficiently large for filtering out vertical rate component signals from the frequency-to-voltage converter output voltage. However, the large time constant of such filter will substantially increase the time required for the output of the frequeny-to-voltage converter to settle to the steady state signal immediately after an abrupt change in the frequency of the synchronizing input signal has occurred. Such increase in the settling time, may be undesirably noticeable on the screen of the television monitor after a change in the frequency of the horizontal sync pulse occurs. Such a change may occur, for example, when a plurality of sources of television signals at different horizontal frequencies are time-multiplexed to provide the television input signal of the monitor. Each time the source of the television signal changes, a noticeable disturbance may, disadvantageously, appear on the screen.

In accordance with an aspect of the invention, a synchronization circuit for a video apparatus is responsive to a synchronizing input signal of a video source that contains synchronizing information at a first frequency for generating from the input signal a repetitive output signal that is synchronized to the input signal. The synchronization circuit includes a controllable source of the repetitive output signal. The synchronizing input signal is applied to the controllable source to perform a given control function in the controllable source during a first portion of a given cycle of a repetitive first control signal that is generated from the input signal. The output signal is applied to the controllable source instead of the input signal during a second portion of the given cycle, as a substitute for the synchronizing input signal to perform the given control function.

In a circuit embodying the invention, the output signal is produced by an OSC of a PLL. When synchronized, the OSC oscillates at the horizontal frequency. The OSC output signal controls the timing of the deflection cycles formed by a deflection circuit output stage in accordance with a synchronizing input signal that contains sync pulses. A first control signal that controls the frequency of the OSC is indicative of the phase difference between the horizontal sync pulses of the synchronizing input signal and the output signal of the OSC. Illustratively, the first control signal synchronizes the phase of the output signal to coincide with the phase of the horizontal sync pulses.

In carrying out an aspect of the invention, the output and synchronizing input signals are coupled to first and second input terminals of a switch. The switch alternately couples the horizontal rate synchronizing input signal and the substantially horizontal rate output signal to an output terminal of the switch during the vertical trace and retrace portions, respectively, of each vertical interval. A frequency-to-voltage converter generates an output signal having a duty cycle that is determined by the frequency of the signal at its input terminal that is coupled from the output terminal of the switch. A lowpass filter filters out, from the variable duty cycle signal, component signals at the horizontal frequency, and above, to provide a direct current (DC) second control signal that is indicative of the frequency of the signal then present at the input terminal of the frequency-to-voltage converter. The second control signal establishes the free running frequency of the OSC, in accordance with the frequency of the synchronizing input signal that is coupled by the switch.

The second control signal can assume a value from a spread of values. Such value, advantageously, causes the free running frequency of the OSC to be approximately equal to the frequency of the sync pulses. Thus, the frequency of the sync pulses may be selected from a required wide span of frequencies. Such span of frequencies may lie, for example, between 15,750 and 31,500 Hz. Thus, the frequency of the sync pulses that may be selected from the wide span of frequencies may lie within a narrow capture range of the OSC that is established by the second control signal.

As described before, during the vertical trace portion of, for example, each picture field period, the synchronizing input signal that contains the horizontal sync pulses is coupled by the switch to the input terminal of the frequency-to-voltage converter. During the vertical retrace portion, the output signal of the OSC, having a frequency that is substantially equal to that of the synchronizing input signal, is coupled to the input terminal of the frequency-to-voltage converter.

Thus, in accordance with a yet further aspect of the invention, the frequency of the signal at the input terminal of the frequency-to-voltage converter is substantially the same throughout the picture vertical period and is equal to that of the horizontal sync pulses. During vertical retrace, such frequency is substantially equal to that of the horizontal sync pulses because the frequency of the output signal, obtained from the OSC operating as a flywheel, does not vary appreciably during vertical retrace from its value during the preceding vertical trace.

As explained before, during vertical trace, the frequency of the OSC output signal is equal to that of the horizontal sync pulses. In this way, during vertical retrace, the signal at the input terminal of the frequency-to-voltage converter is approximately at the horizontal frequency independently of the synchronizing input signal during such vertical retrace interval. Therefore, the variable duty cycle signal produced by the frequency-to-voltage converter does not contain a significant component signal at the field, or vertical, rate. That the variable duty cycles signal does not contain vertical rate component signal is advantageous because the time constant required in the lowpass filter for filtering out the alternate current (AC) components that are at the horizontal rate, and above, from the variable duty cycle signal need not be large. It follows that the transient response time exhibited by the second control signal when abrupt change occurs in the frequency of the horizontal sync pulses of the synchronizing input signal is, advantageously, short. Thus, a television monitor having a horizontal synchronization circuit embodying the invention may be, advantageously, capable of displaying the picture information of a television signal having appreciably different horizontal sync frequencies in corresponding different picture fields without the afore-mentioned disturbance that may occur after a change in the horizontal sync frequency.

The sole FIGURE illustrates a deflection circuit, embodying the invention, that includes a PLL synchronized to a horizontal sync input signal and that includes a phase-control loop circuit for synchronizing the deflection cycles produced by an output stage of the deflection circuit to the output signal of the PLL.

The sole FIGURE illustrates a deflection circuit 200, embodying the invention, that includes a PLL 100 having an OSC 22 that generates a signal $V_F$ at a horizontal frequency $f_H$. Circuit 200 may be used in a display monitor to provide horizontal scanning. In steady state operation, signal $V_F$ is synchronized to a sync signal $H_S$ that, during each vertical trace interval $T_{VT}$ of a vertical cycle, or interval V, is at a frequency $f_H$. During each vertical retrace interval $T_{VR}$, signal $H_S$ may comprise, for example, a wide pulse having a duration that equals, illustratively, to the vertical retrace interval $T_{VR}$. Signal $V_F$ is coupled to a phase correction network 32 of a conventionally built phase-control loop circuit 101 that controls a horizontal output stage 28 by providing a phase reference to phase-control loop 101. Output stage 28 generates a horizontal deflection current $i_Y$ in a deflection winding $L_Y$.

A conventionally generated horizontal retrace pulse signal $V_{FB}$, repeating at intervals H, is produced by output stage 28. Signal $V_{FB}$ provides the actual phase information of deflection current $i_Y$. Phase-control loop circuit 101 synchronizes signal $V_{FB}$, as well as deflection current $i_Y$, to signal $V_F$. Phase correction network 32 includes a phase detector 34 that generates a phase difference representative signal 34a from signals $V_F$ and $V_{FB}$. Signal 34a that is coupled via a lowpass filter 33 to a phase shifter 30 controls the extent of phase shifting of phase shifter 30. Phase shifter 30 shifts the phase of signal $V_F$ for producing at its output terminal a horizontal rate signal $V_{FS}$ that is phase shifted relative to signal $V_F$ and that controls the timing of deflection current $i_Y$ produced by output stage 28. Signal $V_{FS}$ causes deflection current $i_Y$ to be, illustratively, in-phase with signal $V_F$.

The tracking response time, in phase-control loop circuit 101, with respect to phase variations of retrace signal $V_{FB}$ is faster than the corresponding tracking response, in PLL 100, with respect to phase variations of synchronizing input signal $H_S$ that contains the sync pulses. This is so, because phase-control loop circuit 101 is optimized to accommodate fast switching time variations in horizontal output stage 28 that may occur, illustratively, when fast changing electron beam current occurs; whereas PLL circuit 100 is optimized to reject noise or jitter accompanying sync signal $H_S$.

Sync signal $H_S$ is coupled to a buffer 27 that produces a signal $H_{S(1)}$ that is coupled to a phase detector 21, and a signal $H_{S(2)}$ that is coupled to a vertical sync separator 40 that generates a periodic signal $V_S$ having a period that is equal to the vertical interval V and that contains a pulse $V_{ST}$, during the vertical retrace interval $T_{VR}$. Each of signals $H_{S(1)}$ and $H_{S(2)}$ comprises, during each period H that occurs during vertical trace interval $T_{VT}$, an, illustratively, rectangular waveform. The transition times in each of signals $H_{S(1)}$ and $H_{S(2)}$ follow closely the transition times in signal $H_S$, respectively.

In carrying out an aspect of the invention, signal $H_{S(2)}$ is coupled to an input terminal 41a of a selector, or time-multiplexing switch, 41. Horizontal rate signal $V_{FB}$ is coupled to an input terminal 41b of switch 41. Vertical rate signal $V_S$ is coupled to a control terminal 41c of switch 41 for controlling, at the vertical rate, the position of a wiper 41e of switch 41. Wiper 41e couples signal $V_{FB}$ to an output terminal 41d of switch 41 when pulse $V_{ST}$ that occurs during vertical retrace $T_{VR}$ appears at terminal 41c. During interval $T_{VT}$, the remaining portion of the vertical interval that defines vertical trace, signal $V_S$ causes signal $H_{S(2)}$ at a terminal 41a of switch 41 to be coupled by wiper 41e to output terminal 41d. It follows that signal $H_{S(3)}$ at output terminal 41d is at substantially the same frequency $f_H$ during both the vertical trace interval $T_{VT}$ and the vertical retrace interval $T_{VR}$.

In accordance with a further aspect of the invention, signal $H_{S(3)}$ is, advantageously, at frequency $f_H$ during vertical retrace interval $T_{VR}$ irrespective, or independent of the waveform of signal $H_S$ or $H_{S(2)}$ that is present during interval $T_{VR}$. This is so because selector, or switch 41 excludes signal $H_{S(2)}$ from affecting the signal at output terminal 41d throughout vertical retrace interval $T_{VR}$. This is so because switch 41 operates as a multiplexer for time-multiplexing signals $H_{S(2)}$ and $V_{FB}$ to form signal $H_{S(3)}$.

Horizontal rate signal $H_{S(3)}$ is coupled to an input terminal 23c of a frequency-to-voltage converter, or frequency discriminator 23 to provide an open-loop frequency control function. Converter 23 generates at a terminal 23a a signal $V_1$ that is indicative of the frequency of each of signals $V_{FB}$, $H_{S(1)}$, $H_{S(2)}$, $H_{S(3)}$ and $H_S$. Converter 23, generates, at terminal 23a an, illustratively, rectangular pulse signal $V_1$ each time the leading edge of the corresponding pulse of signal $H_{S(3)}$ occurs at terminal 23c. The pulse width, T, of each pulse of signal $V_1$, has a duration that is substantially independent of the frequency of signal $H_{S(3)}$. However, the period between successive pulses of signal $V_1$ is equal to the period between the corresponding successive pulses of signal $H_{S(3)}$. It follows that the duty cycle of the pulses of signal $V_1$ is directly related to the frequency of signal $H_{S(3)}$. The DC voltage component, or the average value, of signal $V_1$ is coupled via a lowpass filter 24 to form a signal $V_2$. Therefore, signal $V_2$ is a DC signal that varies in accordance with the duty cycle of the pulses of signal $V_1$. Such DC voltage component is directly related to the frequency of signal $H_{S(3)}$. The pulse width, T, determines the frequency detection upper limit. Above such upper limit, the duty cycle of signal $V_1$ does not increase when the frequency of the synchronizing input signal $H_S$ increases.

In carrying out another aspect of the invention, the frequency of signal $H_{S(3)}$, at input terminal 23c of frequency-to-voltage converter 23 is substantially the same throughout the vertical interval V and is equal to $f_H$. During vertical retrace interval $T_{VR}$, the frequency of signal $H_{S(3)}$ is equal to that of signal $V_{FB}$ irrespective of the corresponding level or waveform of signal $H_S$ during interval $T_{VR}$. Because the frequency of OSC 22, operating as a flywheel, does not vary appreciably during vertical retrace interval $T_{VR}$, the frequency of signal $V_{FB}$ is maintained substantially equal to $f_H$, its frequency during vertical trace interval $T_{VT}$. During vertical trace interval $T_{VT}$, the frequency of signal $H_{S(3)}$ is equal to the frequency $f_H$ of the sync pulses of signal $H_S$ or of $H_{S(2)}$. Therfore, in accordance with yet another aspect of the invention, the duty cycle of signal $V_1$ remains substantially the same during both vertical trace interval $T_{VT}$ and retrace interval $T_{VR}$. Therefore, the average, or DC component, of signal $V_1$ remains substantially unchanged, during vertical retrace interval $T_{VR}$, independently of the frequency of signal $H_S$ or $H_{S(2)}$, during such interval $T_{VR}$. It follows, in accordance with a yet further aspect of the invention, that signal $V_1$, that is at the frequency $f_H$, does not significantly contain component signals at the vertical rate. Therefore, for filtering out the AC component signals from signal $V_1$, a large time constant in the lowpass filter is not required.

Signal $V_1$ is coupled through a lowpass filter 24 to provide a lowpass-filtered signal $V_2$, that is a DC signal, at an input terminal 20a of a summer 20. DC signal $V_2$ is indicative of the frequency of signal $H_{S(3)}$. Lowpass filter 24 filters out from signal $V_2$ component signals at the horizontal frequency and above.

Because signal $V_1$ does not contain component signals at the vertical rate, as described before, lowpass filter 24 need not have its cutoff frequency at a frequency that is substantially below $f_H$. Therefore, the transient response time of lowpass filter 24 to an abrupt change in the frequency of the horizontal sync pulses of signal $H_S$ or $H_{S(2)}$ may be, advantageously, short. Such abrupt change may occur when, for example, a second source that supplies signal $H_S$ having a second frequency is coupled to buffer 27 immediately following the decoupling of a first source that supplies signal $H_S$ having a first frequency that is different from the second frequency. Thus, a television monitor that utilizes deflection apparatus 200 may not exhibit a significant disturbance after a change occurs in the frequency of signal $H_S$.

Signal $V_2$ is coupled to input terminal 20a of summer 20 that generates, at an output terminal 22a, a combined signal $I_C$ that controls the frequency of OSC 22. A signal $V_{\phi 2}$, as described later on, is coupled to a second input terminal, terminal 20b, of summer 20. Combined signal $I_C$ at terminal 22a is indicative of the sum of signals $V_{\phi 2}$ and $V_2$.

Output signal $V_F$ of OSC 22 is coupled to a terminal 21b of a phase detector 21. Phase detector 21 receives, at a terminal 21a, signal $H_{S(1)}$. Phase detector 21 generates a signal $V_{\phi 1}$ that is indicative of the phase difference between signals $H_S$ and output signal $V_F$ of OSC 22. Signal $V_{\phi 1}$ is coupled through a lowpass filter 26 that comprises the loop filter of PLL 100 to provide signal $V_{\phi 2}$ at terminal 20b of summer 20, as described before. Thus PLL 100 includes phase detector 21, lowpass filter 26 and OSC 22.

The free running, or open-loop, frequency of OSC 22 may be defined, illustratively, as the frequency of signal $V_F$ of OSC 22 when signal $V_{\phi 2}$ is zero. Because of the summation operation of summer 20, signal $V_2$ that is included in combined signal $I_C$ determines the free running frequency of OSC 22. For a given frequency of synchronizing signal $H_S$, signal $V_2$ causes OSC 22 to oscillate at a frequency that is approximately equal to that of signal $H_S$. In steady state operation, signal $V_{\phi 2}$ assumes such a value that, for a given frequency of signal $H_S$, causes the frequency and phase of signal $V_F$ of OSC 22 and of signal $H_S$ to be the same.

Illustratively, the frequency of signal $H_S$ is 15750 Hz, the horizontal frequency in an NTSC standard. Signal $V_2$ permits the frequency of signal $V_F$ of OSC 22 to vary from, illustratively, 15,750 Hz minus a small fraction of 15,750 Hz to 15,750 Hz plus a small fraction of 15,750 Hz, when signal $V_{\phi 2}$ varies between a possible minimum value to a possible maximum value. In another example, when the frequency of signal $H_S$ is 31,500 Hz, the frequency of signal $V_F$ of OSC 22 can vary from 31,500 Hz minus a small fraction of 31500 Hz to 31,500 Hz plus a small fraction of 31,500 Hz. Since each of such fractions is relatively small, the capture range and the capture time are, advantageously, maintained low.

In accordance with another feature of the invention, and as indicated in dashed-line in the FIGURE. Signal $H_{S(3)}$ may also be coupled, for example, to terminal 21a of 21 in lieu of signal $H_{S(1)}$ to provide a phase detection control function. The result is that the synchronizing signal of PLL 100, signal $H_{S(3)}$, is at substantially the frequency $f_H$ throughout the vertical interval V. It follows that signal $V_{\phi 2}$ at terminal 20b of summer 20 advantageously changes very little during vertical retrace, irrespective of the particular waveform of signal $H_S$ during vertical retrace. Therefore, in such embodiment of the invention, the frequency of signal $V_F$ of OSC 22 remains, advantageously, close to frequency $f_H$ throughout the vertical interval V.

What is claimed:

1. A synchronization circuit for a video apparatus responsive to a synchronizing input signal of a video source that contains synchronizing information at a first frequency for generating a repetitive output signal that is synchronized to said input signal, comprising:
   a controllable source of said repetitive output signal;
   means responsive to said input signal for supplying a repetitive first control signal at a second frequency; and
   second means having coupled thereto said synchronizing input signal and said output signal and being responsive to said first control signal for applying said synchronizing input signal to said controllable source during a first portion of a given cycle of said repetitive first control signal to perform a given control function in said controllable source, and for applying said output signal, instead of said input signal, to said controllable source during a second portion of said given cycle as a substitute for said synchronizing input signal to perform said given control function.

2. A synchronization circuit according to claim 1 wherein said controllable source comprises an oscillator and wherein said second means alternately applies said synchronizing input signal and said output signal to said oscillator for controlling the open-loop frequency of said oscillator.

3. A synchronization circuit according to claim 1 wherein said controllable source comprises an oscillator, wherein, during said first portion of said given cycle, said second means applies said synchronizing input signal to said oscillator for synchronizing said oscillator in accordance with said input signal, and wherein, during said second portion of said given cycle, said second means applies said output signal, instead of said input signal, to said oscillator for maintaining the frequency of said output signal at substantially the same value during both said first and second portions of said given cycle.

4. A synchronization circuit according to claim 1 wherein said controllable source comprises an oscillator and further comprising a phase detector having said output signal coupled to a first input terminal thereof and having an output terminal coupled to said oscillator, wherein said second means is coupled to a second input terminal of said phase detector and applies thereto said input signal during said first portion of said given cycle and said output signal instead of said input signal during said second portion of said given cycle.

5. A synchronization circuit according to claim 1 wherein said second means comprises a selector having an output terminal for forming thereat a second control signal that is applied to said controllable source for controlling said controllable source, said selector being responsive to said first control signal for selecting, alternately, said input and output signals respectively, to be applied at said output terminal of said selector to form said second control signal.

6. A synchronization circuit according to claim 1 wherein said second means generates from said input and output signals a second control signal at a control terminal of said controllable source that performs said control function during both said first and second portions of said given cycle.

7. A synchronization circuit according to claim 6 further comprising, a frequency discriminator that is responsive to said second control signal for generating therefrom a third control signal that is at substantially the same level throughout said first and second portions of said given cycle of said first control signal.

8. A synchronization circuit according to claim 6 wherein said second control signal provides phase information for synchronizing said output signal to said input signal.

9. A synchronization circuit according to claim 1, further comprising, a deflection circuit output stage responsive to said output signal for generating a deflection current at a frequency that is in accordance with said first frequency.

10. A synchronization circuit according to claim 1 wherein said output signal comprises a horizontal retrace pulse voltage.

11. A synchronization circuit according to claim 1 wherein said first frequency is the horizontal deflection frequency and wherein said second frequency is the vertical deflection frequency.

12. A synchronization circuit according to cClaim 1 wherein said second means comprises a switch, responsive to said first control signal, that provides switching operation at said second frequency for applying, alternately, said synchronizing input signal and said output signal to a control terminal of said controllable source.

13. A synchronization circuit according to claim 1 wherein said second means applies said output signal instead of said input signal during said second portion of said given cycle irrespective of the waveform of said input signal during said second portion.

14. A synchronization circuit according to claim 1 wherein said second means comprises a multiplexer for time-multiplexing said input and output signals onto a control terminal coupled to said controllable source, in accordance with said first control signal, to form a second control signal.

15. A synchronization circuit according to claim 14 further comprising a frequency discriminator having an input terminal coupled to said control terminal and an output terminal coupled to said controllable source.

16. A circuit for a video apparatus responsive to a synchronizing input signal of a video source that contains horizontal rate related synchronization information for generating from said synchronizing input signal a repetitive output signal that is synchronized to said input signal, comprising:

a controllable oscillator for generating said output signal;

a phase detector responsive to said synchronizing input signal and to said output signal for generating a first control signal that is applied to said controllable oscillator;

a frequency-to-voltage converter having an output terminal for generating a second control signal that is applied to said controllable oscillator to control the open-loop frequency of said oscillator;

a source of a signal at a vertical rate; and switching means responsive to said vertical rate signal that is coupled to a control terminal of said switching means for applying said synchronizing input signal to an input terminal of said freqency-to-voltage converter during vertical retrace, and for applying said output signal to said input terminal of said frequency-to-voltage converter during vertical trace.

17. A circuit according to claim 16, wherein said output signal is applied to a first input terminal of said phase detector, wherein said switching means applies said synchronizing input signal to a second input terminal of said phase detector during vertical trace, and applies said output signal to said second input terminal instead of said input signal during vertical retrace, and wherein said phase detector generates said first control signal that is indicative of the phase difference between the signals at said first and second input terminals of said phase detector.

* * * * *